J. S. WILLIAMS.
PLANT FOR CONCRETE CONSTRUCTION.
APPLICATION FILED JAN. 22, 1913.
1,349,992.
Patented Aug. 17, 1920.
6 SHEETS—SHEET 5.
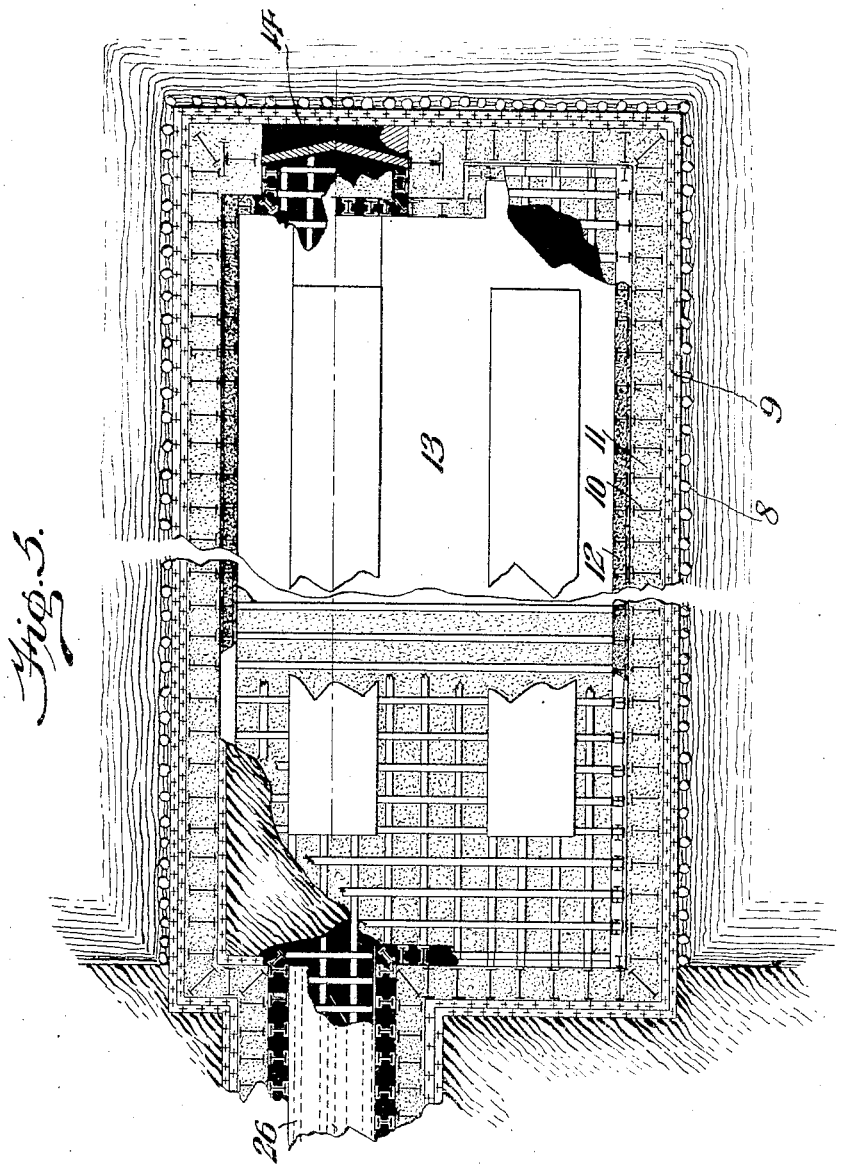

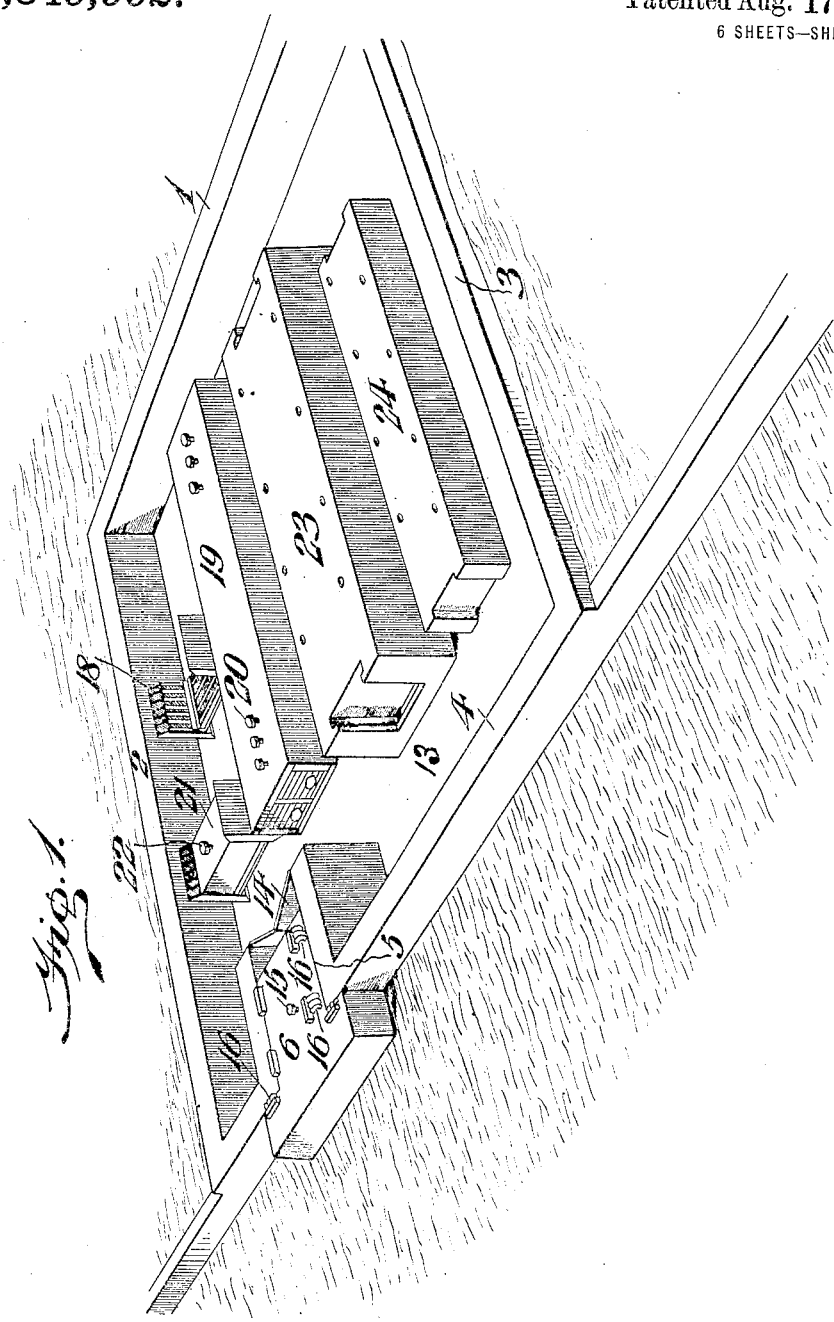

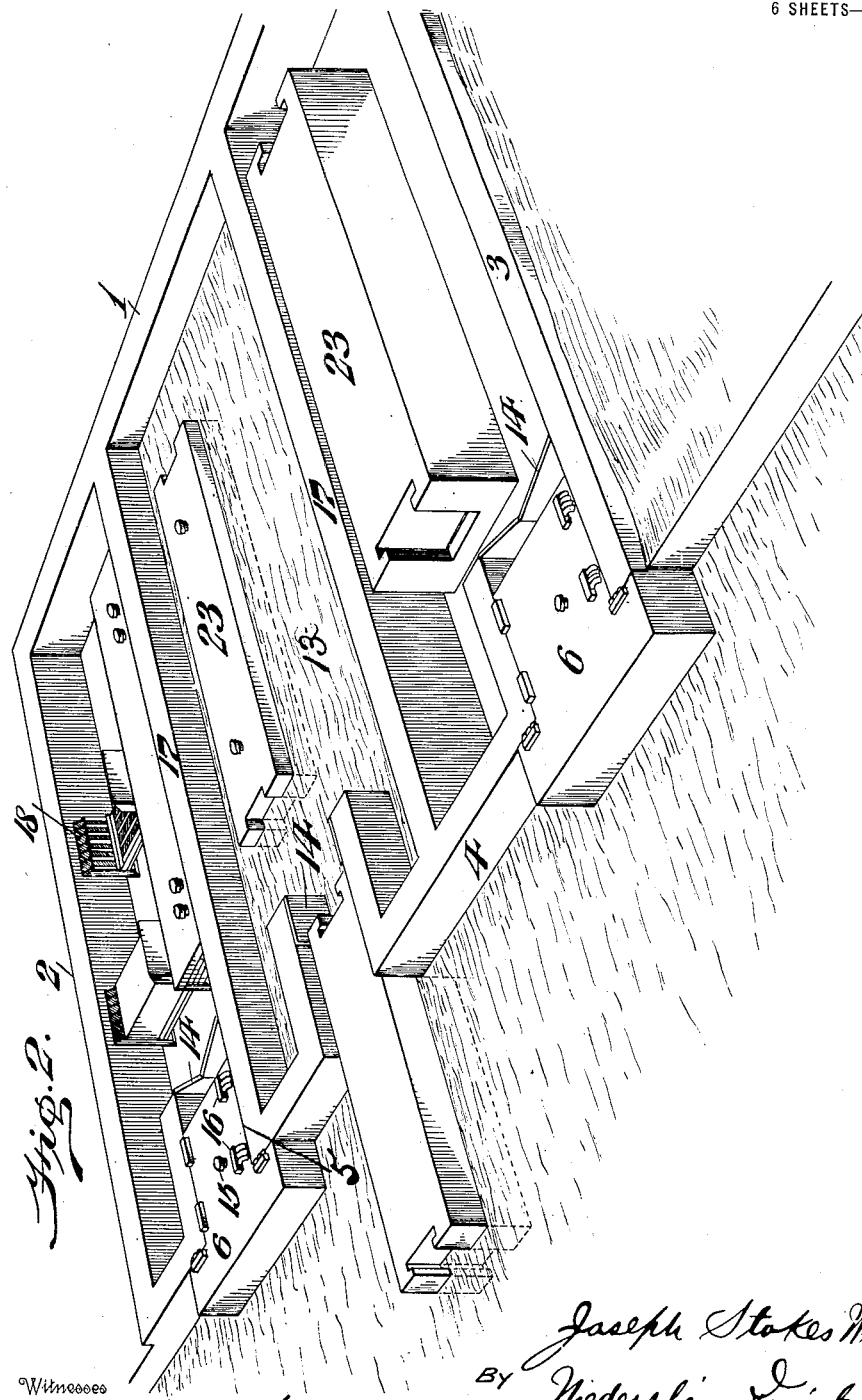

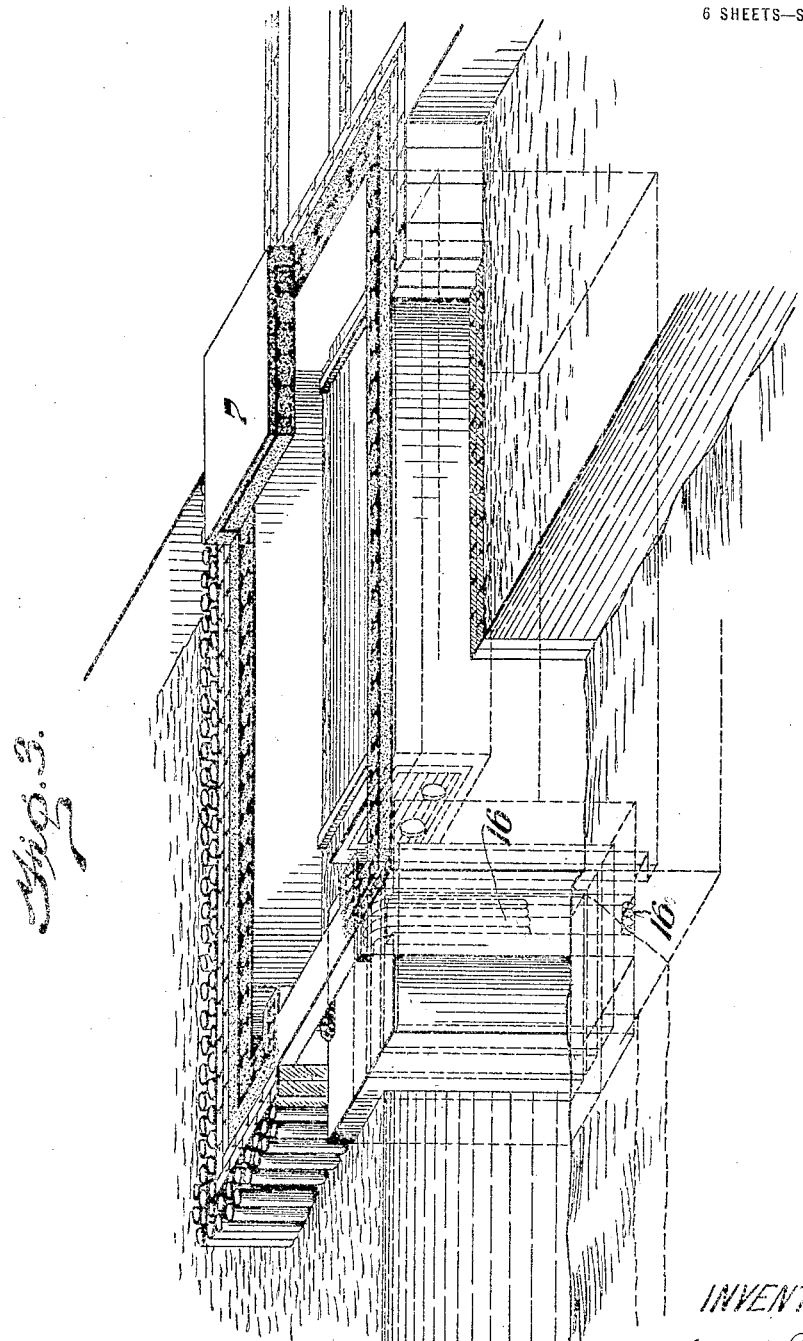

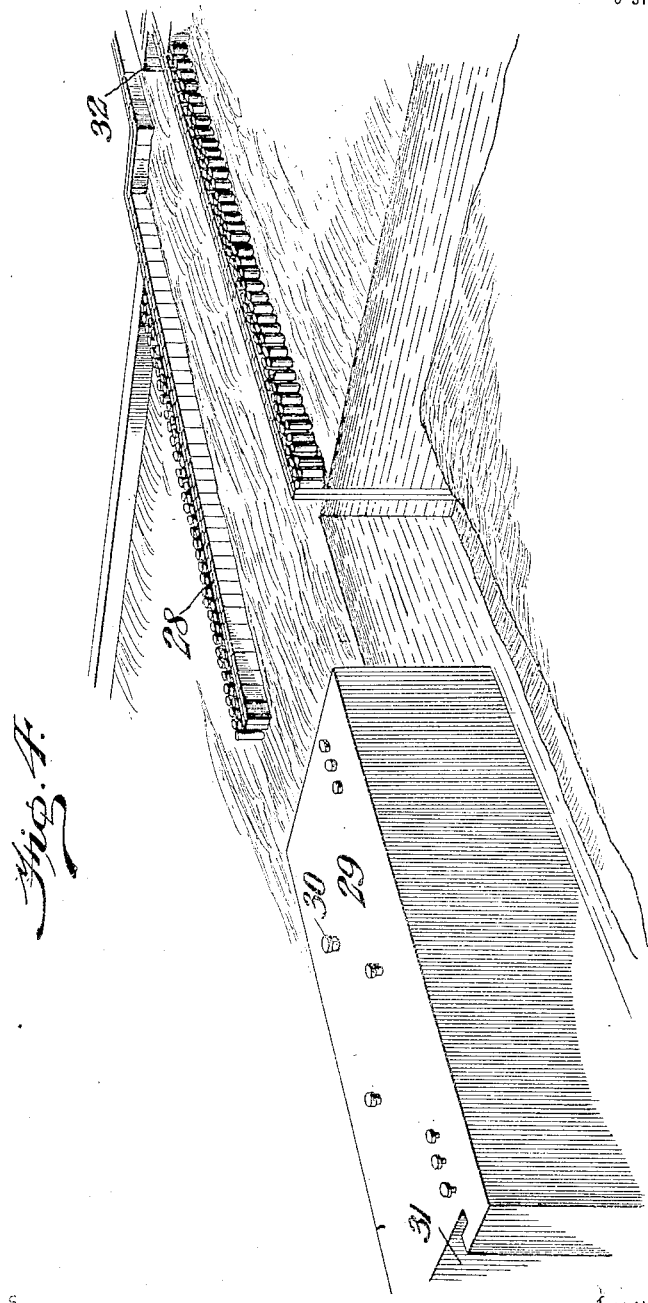

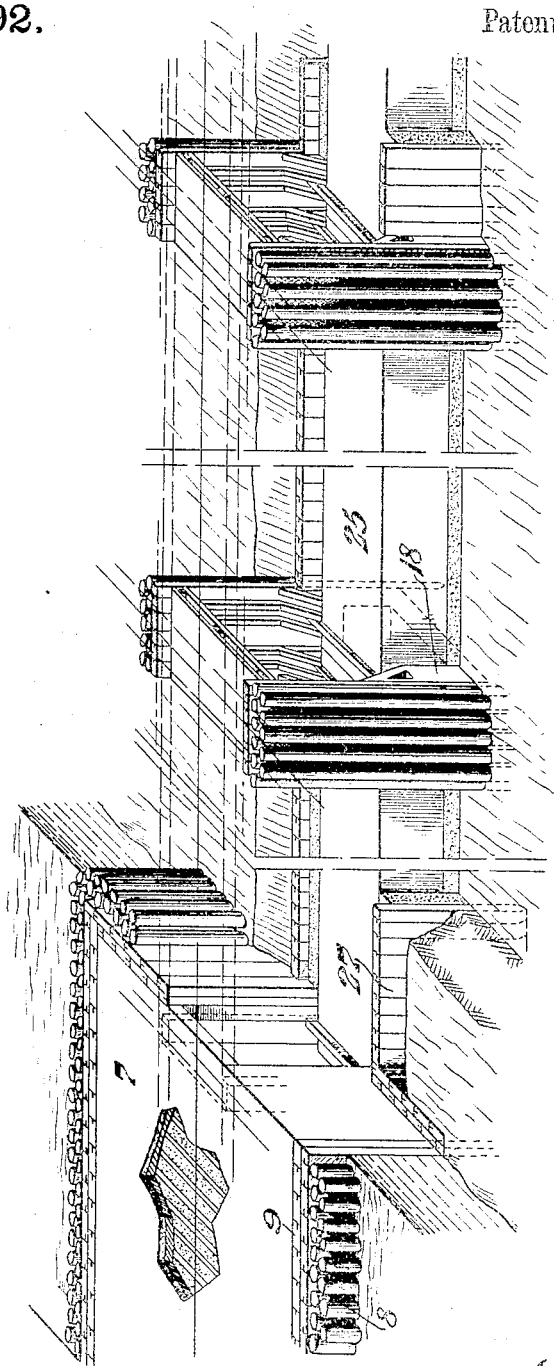

UNITED STATES PATENT OFFICE.

JOSEPH STOKES WILLIAMS, OF RIVERTON, NEW JERSEY.

PLANT FOR CONCRETE CONSTRUCTION.

1,349,992.  Specification of Letters Patent.  Patented Aug. 17, 1920.

Application filed January 22, 1913. Serial No. 743,431.

*To all whom it may concern:*

Be it known that I, JOSEPH STOKES WILLIAMS, a citizen of the United States, residing at Riverton, in the county of Burlington, State of New Jersey, have invented a new and useful Plant for Concrete Constructions, of which the following is a specification.

My present invention consists of a novel plant which is specially designed for use in building up of concrete constructions which are thereafter floated or otherwise transported into position to be established upon a foundation of any desired type, and my novel plant is designed to eventually be employed as a connecting link with tunnel or subway lines, if desired.

It further consists of a novel method of constructing such plant and a novel manner of sealing the passageways thereto whereby the construction built up within the plant may be transported therefrom through such passageways.

It further consists of a novel construction and arrangement of floatable closures, the floatability of which may be varied, and novel means for sealing the closures in position in the passageways.

Further objects and purposes of my invention will more clearly hereinafter appear in the detailed description.

For the purpose of illustrating my invention, I have shown in the accompanying drawings, certain forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a plant for concrete constructions embodying my invention.

Fig. 2 represents a perspective view of another embodiment of my invention.

Fig. 3 represents a perspective view, partly in section, of the plant showing the waterway connection and a tunnel section in flotation within the plant.

Fig. 4 represents a perspective view of another embodiment of my invention, showing another manner of establishing the plant in position in the waterway.

Fig. 5 represents a sectional plan view of the plant as connected with a subway line.

Fig. 6 represents a perspective view of the plant as connected with a tunnel line and forming a portion thereof.

Similar numerals of reference indicate corresponding parts in the figures.

Referring to the drawings:—

The term concrete, as used herein, is intended to be broadly construed as covering concrete of any desired nature with any desired reinforcement, the nature of which latter varies widely in practice in accordance with the conditions and requirements of each case.

The walls of the plant may be constructed in any desired manner and, as seen in Fig. 1, comprise a rear wall 1, side walls 2 and 3, and a front wall 4, which latter is provided with a passageway 5 therethrough, which is sealed when desired by means of a removable closure 6, internally chambered in any desired manner. After the walls are laid, the space between is excavated to a desired grade, and the foundation bed is reinforced to any desired supporting capacity. The walls of the plant or the reinforcements thereof may be extended to any desired depth below the foundation bed in order to prevent any possibility of undercutting. The walls of the plant may extend to any desired height above the water level to secure the same from flooding, and a working platform or wharf floor 7, see Figs. 3 and 6, which will cover the construction either wholly or in part, and this working platform may consist of tracks supported over the plant adapted to carry any desired apparatus, such as conveying, hoisting or other mechanism, employed in the construction of different parts of the work. The walls of the plant may be surrounded, if desired, by piling 8, within which is a desired number of layers of sheet piling 9. Within the sheet piling 9, the walls of the plant are preferably formed of structural metal 10 embedded in concrete 11 and lined with a metal reinforced waterproof layer 12, it being understood that the foundation or floor part is waterproofed and reinforced in a similar manner, as will be clearly understood by reference to Fig. 5. The foundation floor 13 is formed preferably by reinforcing the bed with piling or ballast or both which is rendered waterproof and united in waterproof union with the side walls of the plant, so that when the passageway has been sealed by the removable closure 6, any leakage of water into the plant will be prevented, and when the water is pumped out, a drydock is formed for construction purposes. When the plant is constructed along tide water, the tide itself, in some cases, is sufficient to drain the water from the dock but in the majority of cases, it is essential to provide means for withdrawing water from the dock and to provide a sufficient depth of channel in the floatable portion of the waterway for the largest construction to be made therein. In Fig. 5 lock gates 14 are shown adapted to open outwardly, but I preferably employ novel means for controlling the passageways consisting of a floatable closure, such as 6, provided with a desired number of conduits 15, see Figs. 1 and 2, whereby fluid or other ballasting material may be passed into the interior of the closure to vary the floatability thereof. One advantageous manner of doing this is to admit water into the chamber of the closure in order to sink the same in alined position between the walls of the passageway and when it is desired to remove the closure, this water may be removed by any desired type of pumping apparatus or by forcing any desired fluid or gas into the closure in order to expel the water and increase the floatability of the closure. In order to form a water tight seal to seal the walls of the closure and the walls of the passageway, either the walls of the closure or the walls of the passageway are chambered or recessed in order to receive packing material of any desired nature which will form a watertight seal at such point. One simple and economical manner of doing this is by the employment of one or more inflatable tubes or series of tubes 16 adapted to be inflated or deflated, any well known means being provided, for example, any desired fluid under pressure, such as gas, air or water. These tubes are made of any desired material which is suitable for sealing the surfaces with which they contact and such material is preferably capable of compression in order to increase its elasticity and controllability as a sealing medium. In order to illustrate one manner of sealing passageways, I have illustrated three sets of these tubes, two sets being shown at the side of the closure, and the third set in proximity to the end of the closure. As will be understood by reference to Fig. 2, the plant may be provided with any desired number of partitions 17, and any desired number of sealable passageways whereby the constructions built up in one compartment may be floated or otherwise transported therefrom without effecting the constructions which are being built in another compartment.

In Figs. 1 and 2, I have shown different types of construction, such as for example, pier members or cradles 18, tunnel sections 19 having controllable conduits 20 whereby the floatability of the construction may be varied, and I have also shown floatable supports 21, which are adapted to be connected with the cradles 18 in case the same are not floatable in themselves, whereby such cradles may be floated into position. The members 21 are provided with controllable conduits 22, in order that the floatability thereof may be varied. 23 and 24 designate other types of reinforced concrete construction which may be built up within the plant. The walls of the plant are especially adapted to form a connecting link with the passageway, such as a tunnel line 25, see Fig. 6, or a subway 26, see Fig. 5, or with conduits of any desired nature. The cradles 18 correspond to the cradles 18 seen in Fig. 6, where they are shown as forming a part of the foundation bed of the tunnel. The foundation bed for such purpose is dredged to a desired grade and then reinforced along its length to any desired extent. Foundation piers or reinforcements may be constructed at predetermined intervals or with continuous lengths preferably between alining members, such as piling 27 or guide members, floatable if desired, so that the cradles, in case such are used, may be floated into position over a reinforced bed and dropped into alined position thereon or on the piers. Such cradles or reinforcements may be provided with chambers or cells so that when sunk to position, they may be filled with concrete or ballast, or the cradles may be self sinkable and transported into position by detachable floats, as will be understood by reference to Fig. 1. The tunnel sections, such as 19 or 23, or conduits constructed within the plant are preferably provided with removable closures at their ends and the floatability of the structures may be varied or maintained, as desired, by the insertion of fluid of any desired nature through the conduits provided for such purpose, and the ends of the floatable structures are preferably adapted to interlock or provided with interlocking means. When such structures have been floated through the passageway of the plant and sunk into position on the cradles or reinforced bed, they will automatically aline and interlock with each other, after which they may be covered with ballast or other filling, as will be understood by reference to Fig. 6.

It is also within the scope of my invention to construct the plant at one location and then float the same into position in the manner illustrated in Fig. 4, wherein 28 designates parallel rows of piling between which the plant 29 is to be located. The plant 29 is provided with controllable conduits 30, whereby its floatability may be varied and its end 31 is formed to interlock with reinforced concrete construction of any desired nature. 32 designates the passage in which the subway connection is to be built up and united with the plant structure in a similar manner to that seen in Fig. 5. After the plant has been permanently located to form a connecting link with traffic and transportation systems, such as subway, tunnel and surface lines of transportation, the passageway, such as 5, is sealed preferably with a reinforced concrete construction, extending above the water line to any desired height and any desired number of floors may be established having communication therebetween, such as passageways and elevators, in order to provide communication between the upper floor and the tunnel and subway lines, the upper floor being preferably in communication with surface traffic lines.

In accordance with my present invention, I provide novel means for enabling the construction of reinforced concrete structures, such plant being adapted to be located at any desired point as a permanent part of the work and to be united with the construction, such as tunnel and subway lines, when such lines are complete.

It will now be apparent that I have devised a novel and useful construction of a plant for concrete constructions, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. A plant of the character stated, comprising a plurality of juxtaposed chambers in the earth bed extending below the water level, watertight walls about said chambers, and walls separating the chamber, said chamber having passageways for waterway communication for each of said chambers, reinforced cementitious foundation floors in each of said chambers, in combination with the earth bed thereunder, means to open and close each of the passageways of said chambers to place said chambers in or out of open communication with a waterway as required, working platforms along the sides of the walls of said chambers, and working platforms and equipments about the upper part of walls, a subway passage extending from one or more of said chambers into shore, and means to open and close said subway.

2. A construction of the character stated, comprising a chambered concrete construction in the earth mainly below water level, and in communication with a waterway having a passageway through the walls of such construction to such waterway, a subway tunnel passage through another portion of said walls to shore, and means to effect the opening or watertight closure of the passageway.

3. A plant of the character stated, comprising waterproofed reinforced concrete waterproof walls extending from the foundation to above the water line and into the earth bed, and having a platform supported on said walls and having a passageway through one of said walls in water communication, a subway line in communication with said walls, a floatable and sinkable closure for said passageway, forming with the walls thereof chambers, and sealing means within said chambers.

4. A plant of the character stated, comprising walls extending into the foundation bed, and an intermediate wall forming a plurality of watertight compartments, each compartment having a passageway therefrom, a floatable and sinkable closure for each passageway, means to vary the floatability of each closure, and means to seal each closure in its respective passageway.

5. A plant of the character stated, comprising a reinforced concrete foundation floor, reinforced concrete outer walls extending into the foundation bed, the reinforcements of which are in union with the reinforcements of a reinforced concrete foundation floor, inner walls in structural and cementitious watertight union with the side walls and forming therewith a plurality of independent chambers, each having a passageway therefrom, and independent means to seal each passageway, whereby each chamber is rendered watertight.

6. A plant of the character stated, comprising waterproofed reinforced concrete walls having a passage therethrough in communication with a waterway, a piled and ballasted foundation bed capped with a foundation floor of reinforced concrete extending in structural, cementitious, and waterproof union with said walls, and means to seal said passageway.

7. A plant of the character stated, comprising walls of waterproofed reinforced concrete having a passageway therethrough in communication with a waterway, a piled and ballasted foundation bed, a reinforced concrete floor on said bed in structural reinforced and cementitious union with said walls, a working platform located above said bed, and means to seal said passageway.

8. A plant of the character stated, comprising waterproofed, reinforced concrete side walls extending beneath the foundation bed to prevent undercutting, a waterproofed reinforced concrete foundation floor united with said walls, one of said side walls having passage therethrough in communication with a waterway, a working platform above said floor, and means to open and close said passage.

9. A plant of the character stated, in combination with a subway line opening into it, and means to close said subway line to prevent water passing from the plant into it.

10. A plant of the character stated, in combination with a subway line opening into it and having its walls in waterproof union with the walls of the plant.

JOSEPH STOKES WILLIAMS.

Witnesses:
H. S. FAIRBANKS,
C. D. McVAY.